United States Patent [19]
Ryles

[11] Patent Number: 6,077,422
[45] Date of Patent: Jun. 20, 2000

[54] LIQUID FILTERING APPARATUS

[75] Inventor: Louis Ryles, Paradise Waters, Australia

[73] Assignee: Filter Technologies Pty Ltd, Australia

[21] Appl. No.: 08/850,922

[22] Filed: May 2, 1997

Related U.S. Application Data

[63] Continuation of application No. PCT/AU95/00735, Nov. 6, 1995.

[30] Foreign Application Priority Data

Nov. 4, 1994 [AU] Australia .................... PM9218

[51] Int. Cl.⁷ ............... B01D 35/16; B01D 65/02
[52] U.S. Cl. ............ 210/108; 210/321.69; 210/356; 210/411; 210/425
[58] Field of Search ............... 210/108, 321.69, 210/333.01, 420, 422, 423, 425, 426, 427, 488, 636, 650, 411, 354–356, 412; 55/302, 304

[56] References Cited

U.S. PATENT DOCUMENTS

| | | |
|---|---|---|
| 2,366,112 | 12/1944 | Jokel . |
| 3,332,259 | 7/1967 | Zylstra ........................ 210/356 |
| 4,468,971 | 3/1987 | Pabst ........................... 210/354 |
| 4,477,343 | 10/1984 | Tucker ......................... 210/108 |
| 4,552,655 | 11/1985 | Granot ......................... 210/108 |
| 4,614,581 | 9/1986 | Drori ........................... 210/108 |
| 4,645,591 | 2/1987 | Gerulis ......................... 210/108 |
| 4,736,671 | 4/1988 | Drori ........................... 210/108 |
| 4,774,000 | 9/1988 | Kawai et al. .................. 210/488 |
| 4,806,217 | 2/1989 | Rosenberg ..................... 210/108 |
| 4,812,230 | 3/1989 | Gerulis ......................... 210/108 |
| 4,936,989 | 6/1990 | Walker ......................... 210/354 |
| 5,037,548 | 8/1991 | Rosenberg ..................... 210/488 |
| 5,112,503 | 5/1992 | Raifman ........................ 210/488 |
| 5,234,605 | 8/1993 | Reipur et al. .................. 210/741 |
| 5,389,243 | 2/1995 | Kaplan ......................... 210/108 |

*Primary Examiner*—Joseph W. Drodge
*Attorney, Agent, or Firm*—Hoffman, Wasson & Gitler

[57] ABSTRACT

A liquid filtering apparatus which reduces or eliminates the need for regular manual cleaning or backwashing. Backwashing of the filter occurs automatically in response to sensed conditions of filtering. The filtering apparatus includes a chamber, and a filter element in the chamber, a valve for directing liquid through the filtering element in a first direction to filter the liquid. The valve reverses the direction of liquid flow through the filtering element when excessive resistance to flow through the filter element occurs.

14 Claims, 5 Drawing Sheets

LIQUID FILTERING APPARATUS

The present application is a continuation of international application PCT/AU95/00735, filed Nov. 6, 1995, which designated the U.S.

FIELD OF THE INVENTION

This invention relates to liquid filtering apparatus which has particular but not exclusive application to filtering water, for example water from swimming or spa pools.

BACKGROUND ART

Filtering apparatus is commonly used in swimming and spa pools for filtering the water in such pools. The apparatus which is in use is in a number of different forms ranging from cartridge type filters to sand and diatomaceous earth filters. Each type of filter is required to be regularly cleaned to maintain the efficiency of the filtering operation and also to ensure that excessive pressure loadings are not applied to the circulating pump. In the case of cartridge type filters, the filter is required to be disassembled, the filter cartridge removed and cleaned before reassembly. In the case of sand or diatomaceous earth filters, cleaning is accomplished by backwashing, that is by causing the flow of water to pass in a reverse direction through the filter to displace collected dirt from the filter material. Often backwashing is only carried out when the filter is substantially blocked and is normally achieved manually by operation of a valve to effect a reversal in the flow of the water. Usually also, the latter filters are required to be disassembled at regular intervals and recharged with sand or diatomaceous earth. The cleaning procedures described above are tedious and time consuming. Additionally, if these filters are not regularly cleaned, the efficiency of filtering is substantially reduced which, for example, reduces the efficiency of vacuum pool cleaners.

Liquid filtering apparatus is also used in many other applications for cleaning a liquid supply, for example, in irrigation systems where water is required to be filtered to prevent blockage of water sprinklers or the like. This form of apparatus also is required to be regularly cleaned to maintain cleaning efficiency.

SUMMARY OF THE INVENTION

The present invention aims to provide liquid filtering apparatus which reduces or eliminates the need for regular manual cleaning or backwashing. In particular preferred aspect, the present invention aims to provide apparatus in which backwashing of the filter occurs automatically in response to sensed conditions of filtering. The filtering apparatus of the invention is suitable for a range of liquid filtering applications, such as for filtering water for supply to swimming pools or spa pools, for filtering water for supply in irrigation systems or for filtering liquid in other liquid supply applications. Other objects and advantages of the invention will become apparent from the following description.

The present invention thus provides in a preferred aspect, liquid filtering apparatus, said apparatus including a chamber, a filtering element in said chamber, and valve means for directing liquid through said filtering element in a first direction for filtering said liquid, said valve means being operable to reverse the direction of liquid flow through said filtering element when excessive resistance to flow through said filtering element occurs.

Excessive resistance to flow through the filtering element causes an increase in pressure on the upstream side of the filtering element. The valve means may respond directly or indirectly to the increase in pressure to reverse the flow of liquid through the filtering element whereby to backwash the filtering element when back pressure exceeds a predetermined limit.

The valve means may include valves on opposite sides of the filtering element. The valves may be simultaneously opened and closed to reverse the flow of liquid through the filtering element. A further valve may also be provided which is opened upon reversing the flow through the filtering element to direct the backwash flow to waste.

In one preferred form, the filtering element applies a force to the valve means to cause the valve means to be actuated to reverse the flow of liquid through the filtering element. The valve means may include a movable valve member which is coupled to the filtering element and which is moved by the filtering element to a backwash position as a result of build-up of debris or other material on or in the filtering element, thus partially or fully blocking flow through the filtering element.

In the above, the valve means may comprise a first fixed duct having spaced apart ports therein on opposite sides of the filtering element, and a movable valve member coupled to the filtering element so as to be movable therewith to control the opening and closing of the ports. In normal operation, one of the ports is open to direct liquid in a first direction through the filter element and the other port is closed. For backwashing, the one port is closed upon movement of the valve member and the other port is opened to direct liquid in the opposite direction through the filtering element for backwashing.

When the flow of fluid reverses, the filtering element will be cleaned and the flow of fluid will cause, through pressure exerted on the filtering element, the valve means to operate to again reverse the flow for normal operation. At the same time, the further valve will close to prevent dumping to waste.

Means are suitably provided for resisting or opposing movement of the valve member to its backwashing position. Such means may comprise a biased element or elements adapted to co-operate with the valve member. The biasing means may additionally or alternatively comprise a spring which urges the valve member towards its normal filtering position. The bias of the biased element or elements or biasing means is required to be overcome to enable the valve member to move to its backwash position.

The filtering element may be in the form of a porous fabric membrane. The filtering element may adopt opposite arcuate cross-sectional attitudes during filtering and backwashing respectively. The filtering element may flex or flick between its two stable attitudes. This causes the pores of the filtering element to open when the filtering element moves to the backwash position to enhance cleaning of the element. Cleaning is also enhanced by the flexing of the element to its backwash position. A particularly suitable material for the filtering membrane comprises a polyester flannel fabric. A suitable pore size for the fabric comprises 25 micron. As an alternative, the fabric membrane may comprise a relatively stiff porous membrane.

Means may be provided for damping movement of the valve member and limit shock loadings on the valve member.

Means may also be provided for varying the time during which backwashing occurs. Such means suitably controls the movement of the valve member back to its normal operating position. Such means may include a chamber, the exhausting of fluid from which can be selectively controlled.

In a further aspect, the present invention provides liquid filtering apparatus including a chamber, an inlet to said chamber for liquid to be filtered and an outlet for filtered liquid, and a discharge outlet, a filtering membrane in said chamber and separating said chamber into first and second parts, and first valve means for varying the direction of liquid flow through said chamber and said filtering element, said valve means in a first attitude causing liquid to flow in a first direction through said chamber and said membrane for filtering of said liquid, said valve means in a second attitude causing liquid to flow through said chamber and said membrane in a direction opposite said first direction for backwashing said membrane, said valve means being operable to reverse the direction of liquid flow through said filtering membrane when excessive resistance to flow through said filtering membrane during filtering of said liquid occurs.

The valve means is extendably coupled to the filtering membrane and the filtering membrane may cause the valve means to move between the first and second attitudes.

The valve means may include a movable valve member coupled to the membrane whereby when build up of debris and other materials on the filtering membrane during filtering limits flow through the membrane, the membrane applies a force to the valve member and thus causes movement thereof.

The apparatus may also include further valve means for controlling communication of the second part of the chamber with waste, the further valve means being open in said second attitude of the valve means.

The further valve means may be actuated by movement of the valve member. The further valve means may connect the second part of the chamber to waste, only after a predetermined movement of the valve member.

BRIEF DESCRIPTION OF THE DRAWINGS

In order that the invention may be more readily understood and put into practical effect, reference will now be made to the accompanying drawings which illustrate a preferred embodiment of the invention and wherein.

DETAILED DESCRIPTION OF THE INVENTION

Figure 1:
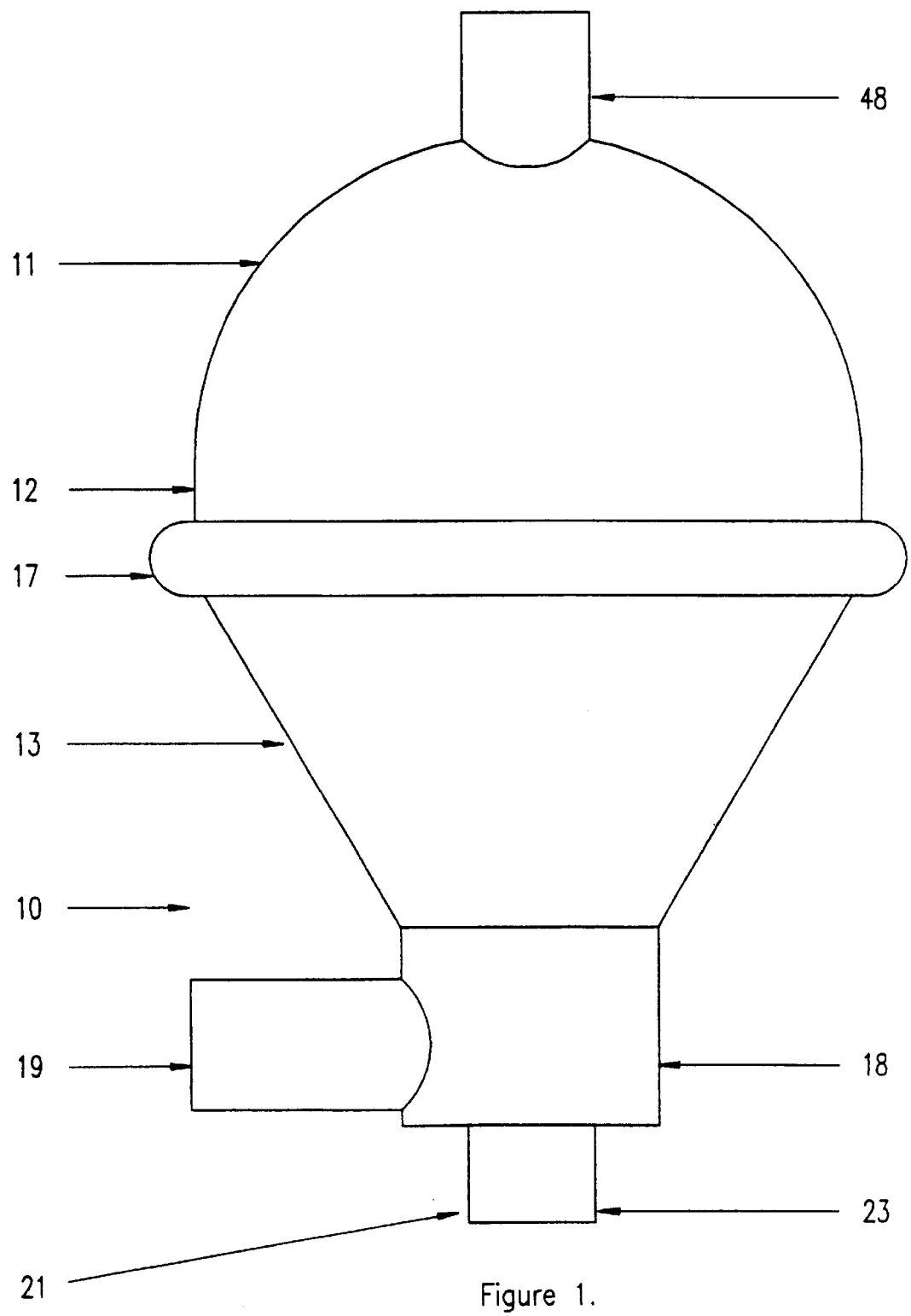
FIG. 1 is a side elevational view of the filtering apparatus of the invention.
Figure 2:
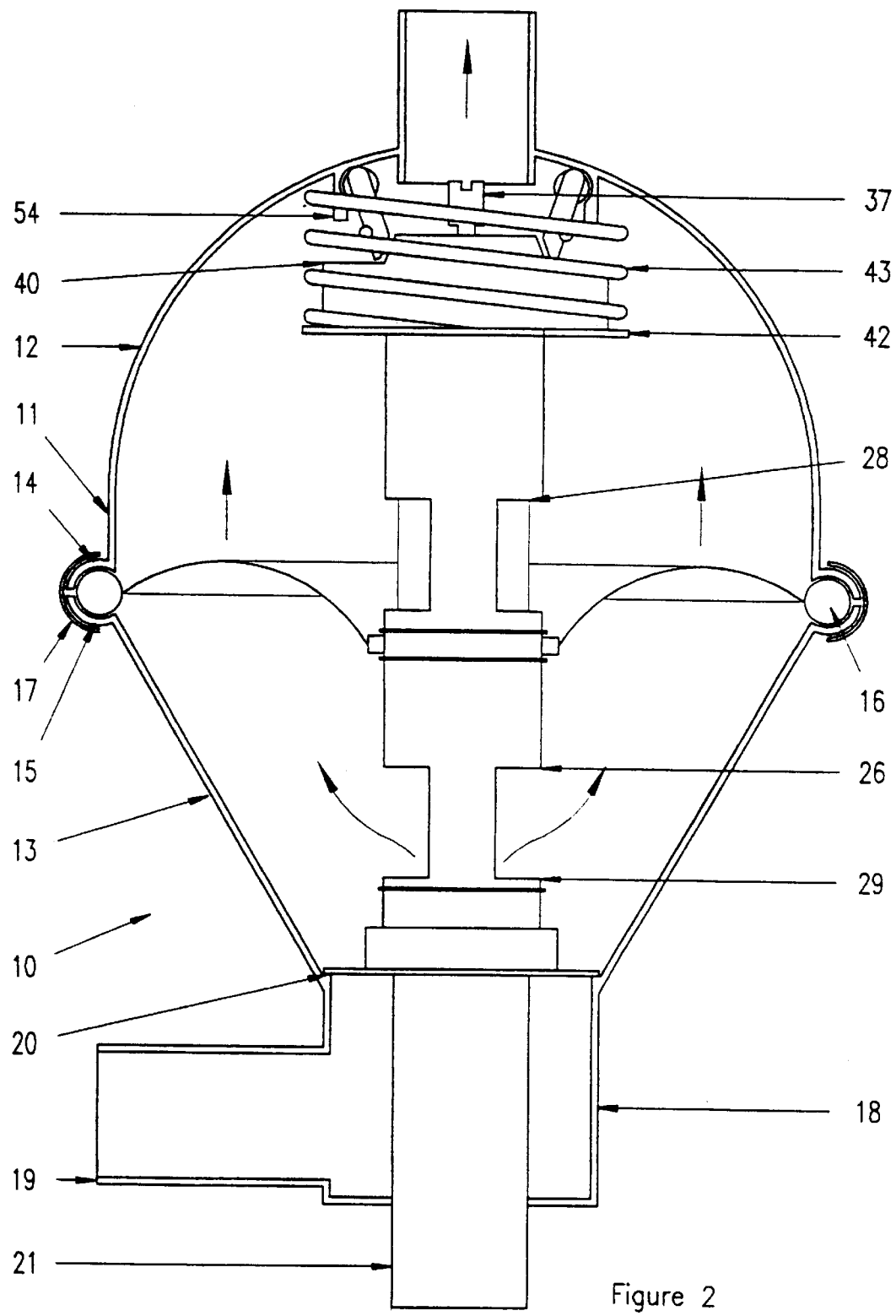
FIG. 2 illustrates the interior of the body of the filtering apparatus.
Figure 3:
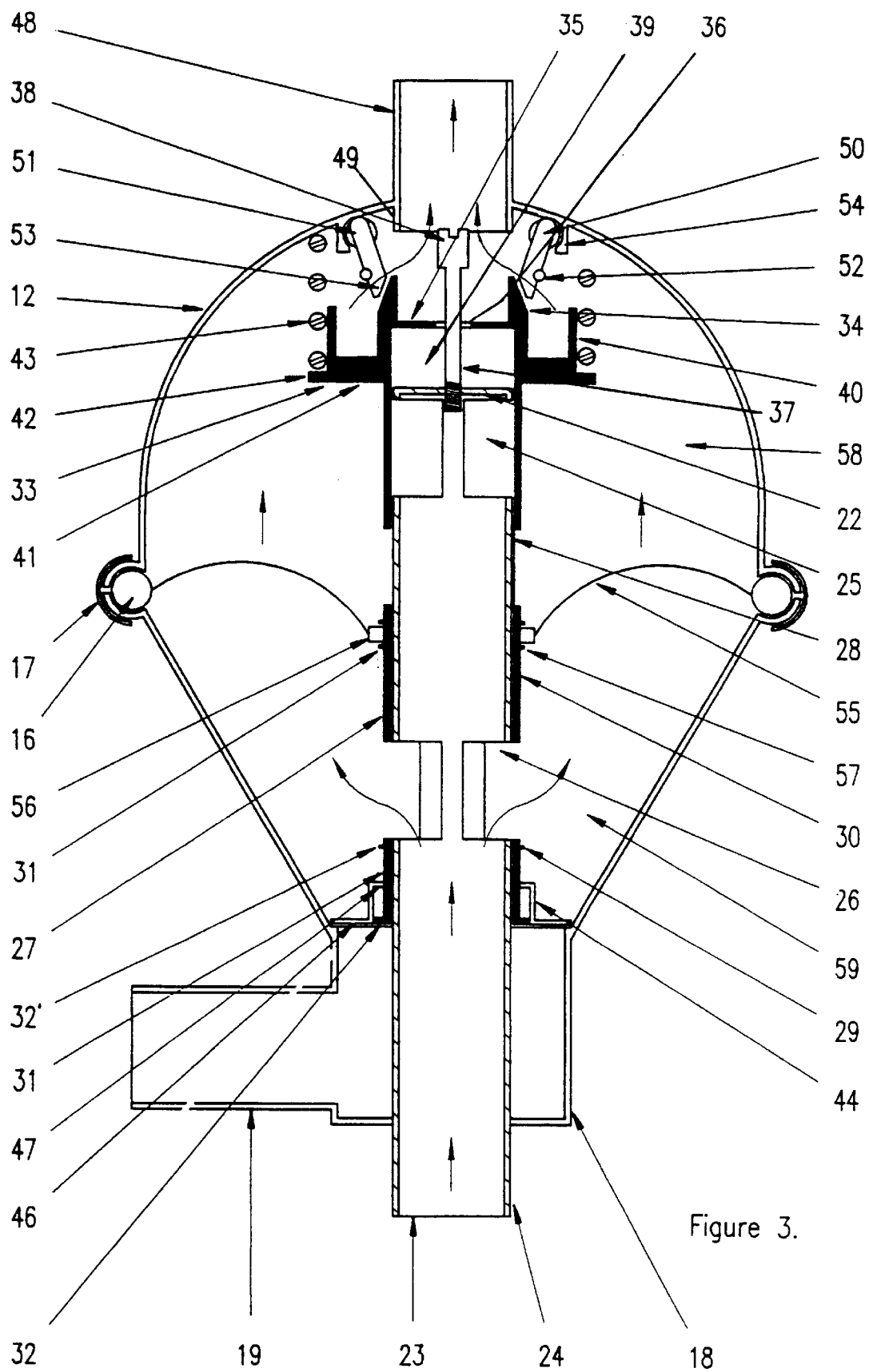
FIG. 3 illustrates in sectional view, the filtering apparatus according to the invention in a normal filtering position.

Referring to the drawings and firstly to FIGS. 1 to 3, there is illustrated filtering apparatus 10 according to the present invention for normally filtering water of a swimming pool or spa but which may be used for filtering other liquids in other applications. The apparatus includes a hollow body or chamber 11 comprising an upper part 12 and a lower part 13 each of which have peripheral flanges 14 and 15 which are adapted to co-operate with an annular seal 16 and an annular clamp 17 which releasably and sealingly secures the two body parts 12 and 13 together about the seal 16. The seal 16 suitably is formed of a resilient material such as santoprene and the clamp 17 is preferably a metal clamp of the type known in the art which incorporates an over-centre lock or a screw tightening mechanism.

A discharge chamber 18 is provided at the lower end of the body part 13 being, for example, integrally formed with the part 13, and includes an outlet 19 for discharge water. The outlet 19 is normally connected to waste. An annular valve seat 20 is provided at the junction between the body part 13 and chamber 18. Extending coaxially through the discharge chamber 18 into and terminating within the body part 12 is a fixed tubular inlet duct 21 which is closed at its end 22 located within the body part 12 and which is open at its other end 23. The end 23 is connected in use to the supply of liquid to be filtered, in the case of a swimming pool, to a pool pump which withdraws liquid from the pool for filtering. The duct 21 has a side wall 24 and upper and lower sets of ports 25 and 26 in the form of openings in the side wall 24.

Located coaxially about the duct 21 is a tubular valve member 27 which is provided with spaced apart openings 28 and 29 in its side wall 30. O-ring seals 31 may be provided between the side wall 30 of the valve member 27 and side wall 24 of the duct 21 on opposite sides of the ports 25 and 26 and openings 28 and 29. The lower end of the valve member 27 is provided with an outwardly directed flange 32, whilst the upper end is provided with an annular extension 33 having an outer frustoconical surface 34, the purpose of which will hereinafter become apparent. The upper end of the member 27 is substantially closed by an end wall 35 which is centrally apertured at 36 to permit a choke screw 37 threadably attached to the upper end of the duct 21 to pass therethrough. The screw 37 has an enlarged head 38 which is of a slightly greater diameter than the diameter of the aperture 36 and may have an outer tapering surface. A damping chamber 39 is defined between the wall 35 and the closed end 22 of the duct 21.

The upper end of the valve member 27 also includes an annular wall 40 spaced radially outwardly from the frustoconical surfaces 34. The annular wall 40 extends from a disc-like support 41 formed integrally with the valve member 27. The disc-like support 41 also defines a support flange 42 for a biasing spring 43 which is interposed between the flange 42 and end of the body part 12.

An annular poppet-like valve member 44 is located coaxially about the lower end of the valve member 27. The member 44 includes a lower annular wall 46 which normally seats on the valve seat 20 and an upper annular wall 47 spaced from the wall 46 and extending inwardly to the member 27 so as to allow relative movement therebetween but being substantially sealed thereto. An annular flange 32' is provided on the valve member 27 above the valve member 44.

The upper housing part 12 is provided with a central outlet duct 48 aligned with the inlet duct 21 and valve member 27. The outlet duct 48 extends into the body part 12 at 49 and has an outer diameter slightly less than the inner diameter of the annular extension 33. A plurality of fingers 50 are pivotally mounted at 51 to the upper end of the housing part 12 and arranged coaxially with the duct 48. An annular biasing member 52, such as a spring or O-ring is provided about the fingers 50 to normally bias the fingers 50 inwardly. The fingers 50 are tapered at their free ends to define inner inclined ramp surfaces 53.

Extending inwardly of the upper housing part 12 and coaxial with the duct 48 is a further annular wall 54 which has an outer diameter slightly less than the inner diameter of the annular wall 40.

A filtering membrane 55 is connected between the seal 16 and valve member 27 and for this purpose is provided with an inner ring 56 located and captured in a recess or channel 57 on the valve member 27. The membrane 55 suitably comprises a fabric such as a polyester flannel fabric. The membrane 55 divides the body 11 into upper and lower chambers 58 and 59 respectively. In FIG. 3, the membrane 49 is arcuate in radial cross-section due to water flowing through it but may adopt an opposite arcuate attitude during backwashing as described further below. Alternatively, the membrane 50 may comprise a relative stiff membrane which has two stable states in which it has an arcuate radial cross-section but which may flick or flex to an opposite stable arcuate state.

In normal operation as shown in FIGS. 2 and 3, liquid passes into the duct 21, through the ports 26 and aligned openings 29 in the valve member 27 and through the membrane 55 for filtering before it passes around the top end of the valve member 27 and out of the outlet duct 48 as indicated by the arrows. At the same time, the ports 25 are blocked by the valve member 27 and the valve member 44 is seated on the valve seat 20. The valve member 27 is biased downwardly by the spring 43 with the annular flange 32' limiting downward movement of the valve member 27 by abutment with the valve member 44. Where debris and other materials collect on the filter membrane 55 and start to limit the flow of liquid therethrough, pressure will increase in the chamber 59. When the bias of the spring 43 is overcome, the valve member 27 will lift upwardly under the influence of the force on the membrane 45. The frustoconical surface 34 on the end of the valve member 27 will thus engage the surfaces 53 on the fingers 51 and the co-operation therebetween will cause the fingers 51 to be pivoted outwardly against the bias of the biasing member 51 applied by the member 52.

Figure 4:
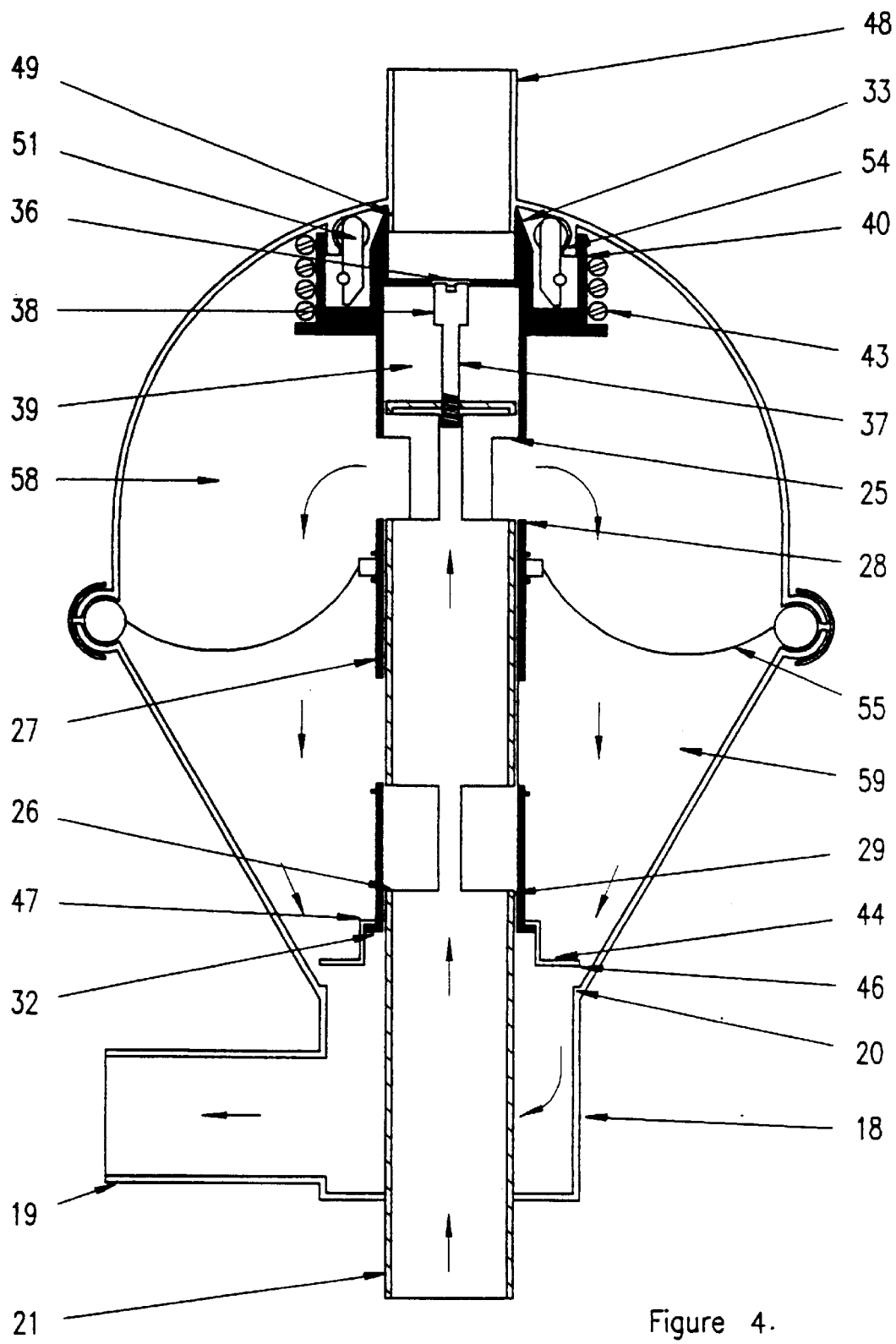
FIG. 4 illustrates in sectional view, the filtering apparatus of FIG. 1 during backwashing.

When the force of the biasing member 52 is overcome and the lower surface 53 of fingers 50 move free of the surface 34, the valve member 27 will rapidly move to the position of FIG. 4 where the annular extension 33 of the valve member 27 surrounds and closes the duct end 49 to prevent water flow therethrough. Movement of the valve member 27 to this position is further enhanced due to the back pressure created when the annular wall 40 approaches the wall 54 thereby throttling flow through the outlet 48 and creating a suction effect. Movement of the valve member 27 to this position, however, is damped through co-operation between the head 38 of the screw 37 and the opening 36. The small clearance between the head 37 and opening 36 will limit flow into the chamber 39 as it expands and thus have a dampening effect on movement of the valve member 27.

After a predetermined upward movement of the valve member 27, the flange 32 on the valve member 27 will engage the wall 47 of the valve member 44 causing the valve member 44 to lift upwardly to raise the annular member 46 from the seat 20. Thus there is a degree of lost suction effect between the valve member 27 and valve member 44. Additionally, the ports 26 will be blocked by the valve member 27, whilst the openings 28 will be moved into alignment with the ports 25. The liquid flowing through the inlet duct 21 will thus be redirected to pass through the ports 25 and openings 28 into the chamber 58 and thus flow through the membrane 55 in the opposite direction. This will cause the filter membrane 55 to rapidly move or flex to an opposite arcuate attitude as shown in FIG. 4 causing the membrane pores to open and debris therein to be flushed therefrom into the chamber 59. The filter membrane 55 is thus backwashed into the chamber 59 with backwash water flowing past the valve seat 20 into the discharge chamber 18 for discharge through the duct 19.

Water will only flow through the membrane 55 in this direction for a short period of time as this flow of water will cause a force to be exerted on the membrane 55 and thus on the valve 27, thereby causing the valve member 27 to move back towards the position of FIG. 2. The period of backwashing can be adjusted by screwing the screw 37 in or out to reposition the head 38 of the screw. Furthermore, as the valve 27 moves towards the FIG. 1 position, the chamber 39 will be reduced in size and water therein past out between the screw head 38 and aperture 36. This restricted flow of water will again damp the movement of the valve member 27 until the head 38 clears the opening 36. The valve member 44, during this movement will also reseat on the valve seat 20 to cut off the flow to waste.

With the valve 27, again in the position of FIG. 1, flow into the chamber 59 will cause the element 55 to move back to its opposite position in FIG. 3 as illustrated for normal filtering.

Because of the flexing action of the filtering membrane 55 as described, only a small quantity of water is required for backwashing. The filtering apparatus 10 will function more efficiently than a normal filter which is usually only backwashed when the filtering membrane or elements are substantially blocked. The filtering apparatus of the present invention will thus allow for greater performance from vacuum pool cleaners, less power consumption and shorter running time. The apparatus 10 may be fitted directly to the top of a pump which results in space saving, particularly in smaller housing blocks, flats and units.

Many variations may be made to the invention without departing from the broad scope and ambit thereof. For example, the valve member 27 may be weighted to provide momentum to move it between its respective positions. The inlet pressure at the duct 21 may also be controlled by a regulator if necessary. The choke screw 35 may also be eliminated in which case the end wall 35 of the valve member 27 may be sealed. In this case to permit escape of water from the chamber 39, the end wall 22 of the duct 21 may be provided with a port. Whilst the spring 43 is shown to be external of the valve member 27, it may be provided internally thereof.

Figure 5:
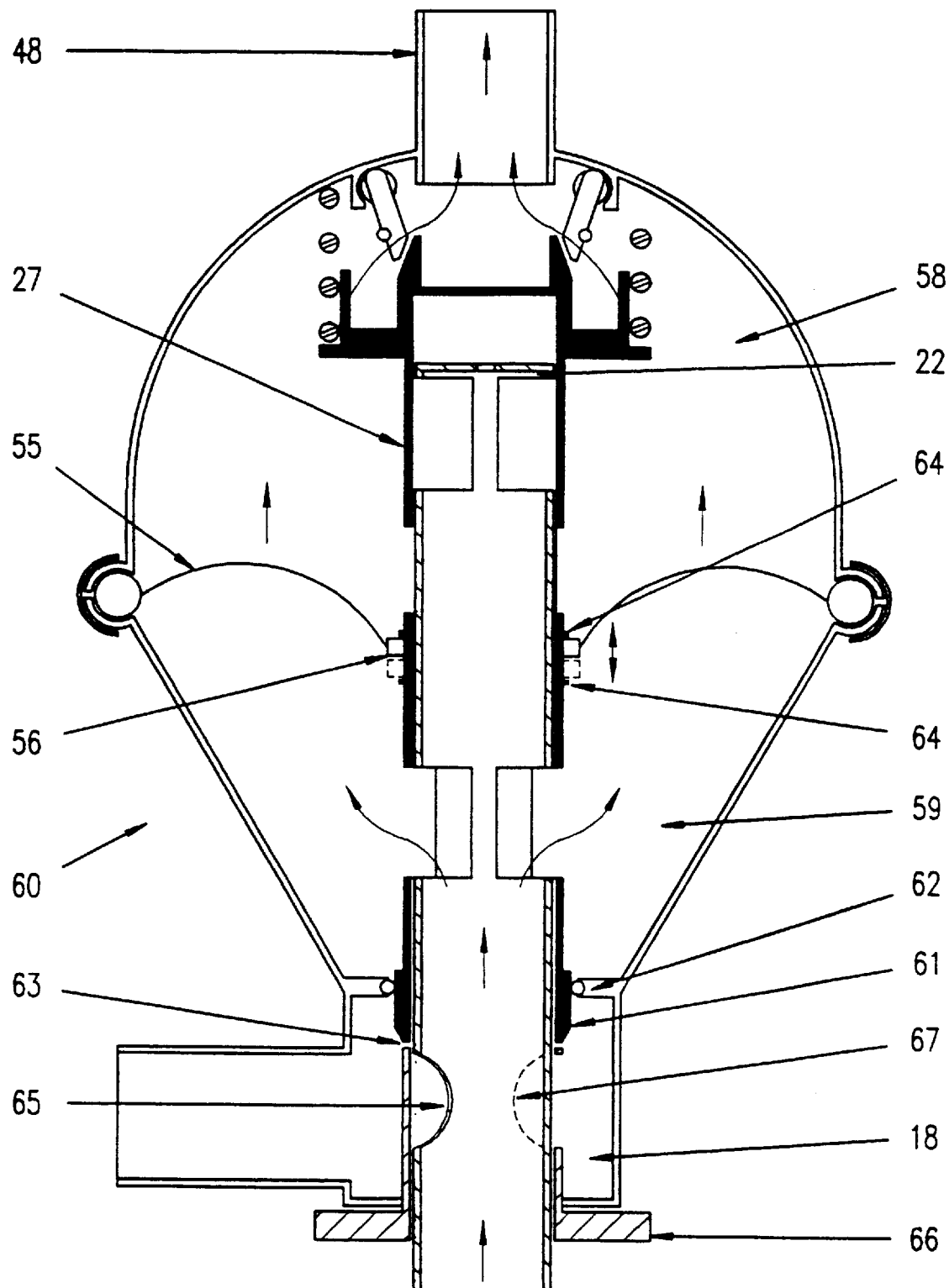
FIG. 5 illustrates a modified form of filtering apparatus according to the invention.

FIG. 5 illustrates a further embodiment of filtering apparatus 60 according to the invention which includes modifications which may be incorporated individually or in combination.

The apparatus 60 is similar to the embodiment of FIGS. 1 to 3 including an inlet duct 21, an outlet duct 48 and a slidable tubular valve member 27 which controls communication between the inlet duct 21 and chambers 58 and 59 on opposite sides of the membrane 55.

In this instance, however, the valve member 44 is replaced by a slide valve member 61 which is movable with the valve member 27 and is normally in sealing engagement with an annular wall 62 which replaces the valve seat 20. As shown, the valve member 61 has a tapered end 63 which when adjacent the annular wall 62 permits communication between the chamber 59 and chamber 18. This will not occur until a predetermined movement of the valve member 27 occurs (as in the embodiment of FIGS. 1 to 3).

In this embodiment also, the ring 56 which supports the inner end of the membrane 55 is free for limited sliding movement between annular stops 64 on the valve member 27 (as shown in dotted outline). By this arrangement an impact force may be applied to the valve member 27 upon reversing of the flow through the membrane 55 due to the ring 56 impacting against one or the other annular stops 64. This assists in moving the valve member 27 between its two positions.

In a further modification, the inlet duct 21 may be provided with a port 65 communicating with the chamber 18. A valve member 66 is located about the inlet duct 21 and normally blocks the port 65. The valve member 66, however, may include an opening 67 which may be moved by rotating the member 66 into alignment with the port 65. This will remove water supply to the body 11 dumping the water inlet to waste and provide a safety measure if, for example the filter is jammed in a backwash position. The embodiment of FIG. 5 also eliminates, as referred to previously, the adjustment screw 37.

The valve mechanism for use with the apparatus may also be substantially varied from that shown. For example, in one form the valves defined between the openings 29 and port 26 and openings 25 and port 28 may be replaced by solenoid valves as may the valve arrangement defined between the valve member 44 and seat 20. In this form, one solenoid valve may be provided to control flow through the outlet 48, whilst the other solenoid valve controls flow to the chamber 59 and through the membrane 55 as well as the discharge to waste for backwashing. A pressure sensor switch located in the chamber 59, upon sensing excess pressure will cause operation of the solenoid valves to prevent water flow through the outlet 48 and cause a reversal of flow through the filtering membrane 55 and open the chamber 59 to waste or discharge for backwashing purposes. This may be done for a set period of time, after which the valves may again be reversed to permit flow through the outlet, close the waste valve and direct the flow in the normal direction through the membrane 55. The membrane 55 in this embodiment may be in a similar form to that described with reference to the drawings except that in this instance it is fixed at its inner periphery.

The membrane 55, of course may be of many different forms and need not necessarily flex between the opposite arcuate attitudes shown but may simply be substantially annular and bulge in opposite directions depending upon the direction of flow. The membrane in the form of FIG. 1, however, may be stiffened on either side by scrim and also may be multi-layered if desired.

The main body components of the embodiment of FIGS. 1 and 2 are preferably formed of plastics by injection moulding or other corrosion resistant material.

Whilst the above has been given by way of illustrative embodiment of the invention, all such modifications and variations thereto as would be apparent to persons skilled in the art are deemed to fall within the broad scope and ambit of the invention as defined in the appended claims.

What is claimed is:

1. A liquid filtering apparatus comprising a chamber, a filtering element in said chamber, and valve means for directing liquid through said filtering element in a first direction for filtering said liquid, said valve means being operable to reverse a direction of liquid flow through said filtering element when resistance to flow through said element occurs,
   wherein said valve means includes a movable valve member, said filtering element being coupled to said valve member and being adapted to move said valve member to reverse said flow of liquid through said filtering element in response to said resistance.

2. A liquid filtering apparatus according to claim 1, wherein said valve means comprises valves on opposite sides of said filtering element, said valves being adapted to be simultaneously opened and closed to reverse said flow of liquid through said filtering element.

3. A liquid filtering apparatus according to claim 2, comprising a further valve which is opened upon reversing said flow through said filtering element to direct said reverse flow to waste.

4. A liquid filtering apparatus according to claim 1, wherein said valve means comprises a first fixed duct having spaced apart ports therein on opposite sides of said filtering element, and wherein said movable valve member is movable to control opening and closing of said ports.

5. A liquid filtering apparatus according to claim 1, wherein said filtering element comprises a porous membrane.

6. A liquid filtering apparatus according to claim 5, wherein said filtering element separates said chamber into first and second parts, said valve means controlling a supply of liquid to said first and second parts of said chamber.

7. A liquid filtering apparatus according to claim 1, comprising means for opposing movement of said valve member to a backwashing position.

8. A liquid filtering apparatus according to claim 7, wherein said opposing means comprises one of a biased element and elements adapted to cooperate with said valve member upon a predetermined movement thereof.

9. A liquid filtering apparatus according to claim 7, wherein said opposing means comprises a spring which urges said valve member towards a normal filtering position.

10. A liquid filtering apparatus comprising a chamber, an inlet to said chamber for liquid to be filtered and an outlet for said filtered liquid, a discharge outlet, a filtering membrane in said chamber, separating said chamber into first and second parts and first valve means for varying a direction of liquid flow through said chamber and said filtering element, said valve means in a first attitude causing said liquid to flow in a first direction through said chamber and said membrane for filtering of said liquid, said valve means in a second attitude causing liquid to flow through said chamber and said membrane in a second direction, opposite said first direction, for backwashing said membrane, said valve means being operable to reverse said direction of liquid flow through said filtering membrane when resistance to flow through said filtering membrane during filtering of said liquid occurs,
   wherein said valve means is coupled to said filtering membrane and wherein said filtering membrane causes said valve means to move between said first and second attitudes in response to said resistance.

11. A liquid filtering apparatus according to claim 10, wherein said valve means includes a movable valve member coupled to said membrane and wherein build up of debris and other materials on said filtering membrane during filtering limits flow through said membrane causing said membrane to apply a force to said valve member and thus movement thereof.

12. A liquid filtering apparatus according to claim 11, comprising further valve means for controlling communication of said second part of said chamber with waste, said further valve means being open in said second attitude of said valve means.

13. A liquid filtering apparatus according to claim 12, wherein said further valve means is actuated by movement of said valve member.

14. A liquid filtering apparatus according to claim 13, wherein said further valve means connects said second part of said chamber to waste, only after a predetermined movement of said valve member occurs.

* * * * *